(No Model.) 2 Sheets—Sheet 1.

C. H. GUEST.
PNEUMATIC TIRE.

No. 539,263. Patented May 14, 1895.

Witnesses
Jesse Kingsbury

Inventor
Charles Henry Guest
By Whitaker & Prevost, Attys.

(No Model.) 2 Sheets—Sheet 2.

C. H. GUEST.
PNEUMATIC TIRE.

No. 539,263. Patented May 14, 1895.

Witnesses.                               Inventor.
Jesse Kingsbury                    Charles Henry Guest
G. A. Vanderschmidt              Whitaker & Prevost, Attys.

THE NORRIS PETERS CO., PHOTO-LITHO., WASHINGTON, D. C.

UNITED STATES PATENT OFFICE.

CHARLES HENRY GUEST, OF BIRMINGHAM, ENGLAND.

PNEUMATIC TIRE.

SPECIFICATION forming part of Letters Patent No. 539,263, dated May 14, 1895.

Application filed October 9, 1893. Serial No. 487,579. (No model.) Patented in England November 23, 1892, No. 21,362; in France November 7, 1893, No. 233,899, and in Belgium March 17, 1894, No. 109,036.

*To all whom it may concern:*

Be it known that I, CHARLES HENRY GUEST, a subject of the Queen of Great Britain, residing at Birmingham, England, have invented new and useful Improvements in Attaching Pneumatic Tires to Wheels, (for which I have obtained Letters Patent in Great Britain, No. 21,362, dated November 23, 1892; in France, No. 233,899, dated November 7, 1893, and in Belgium, No. 109,036, dated March 17, 1894,) of which the following is a specification.

My invention relates to the attachment of pneumatic tires to the rims of wheels by means of wire in such a manner that the covering can be readily loosened to permit of the exposure or removal of the inflatable tube or air-chamber.

According to my invention I attach or secure a tire to the rim of a wheel by means of a wire which passes round the rim and through the edge of the covering partly within such edge and partly without, and I prefer that the ends of the wire be connected together, thereby forming an endless coil. Instead, however, of connecting the ends of the wire together, I may attach them to the rim.

Figure 1:
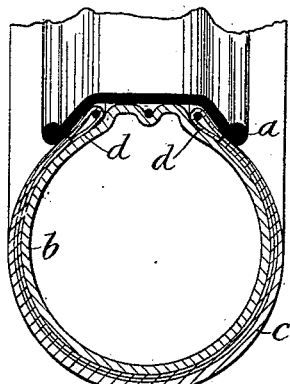
Figure 4:
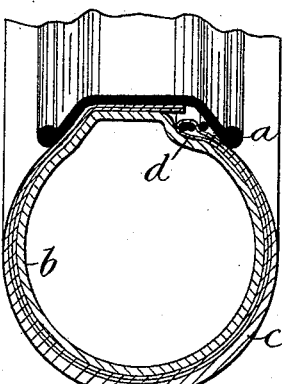
Figure 5:
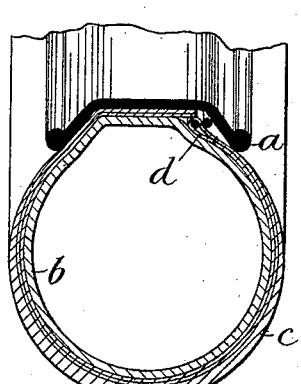
Figure 2:
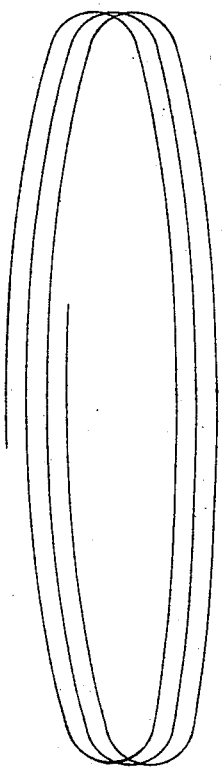
Figure 3:
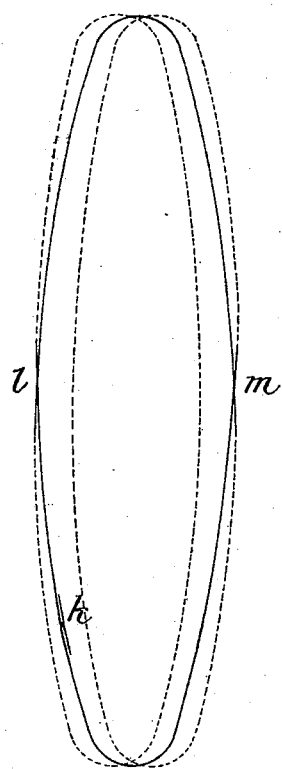
Figure 6:
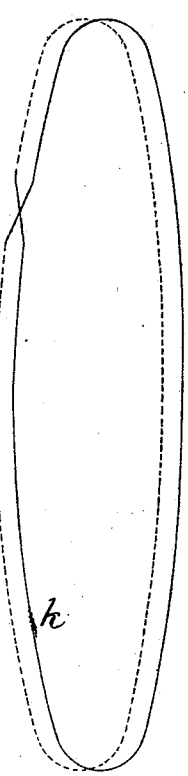
Figure 7:
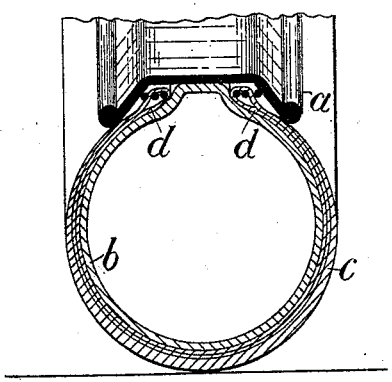
Figures 8, 9, 10:
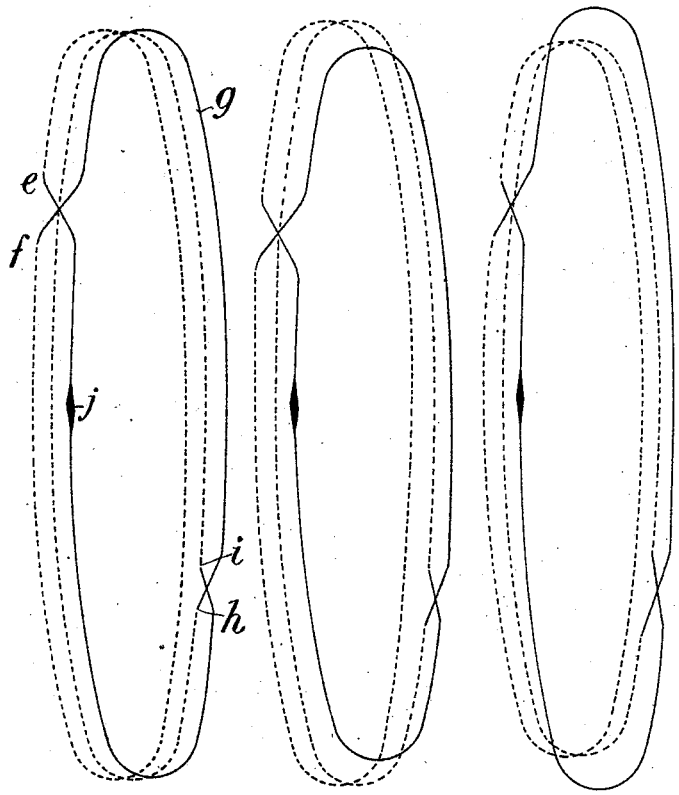

In the accompanying drawings, Figure 1 represents a section of a rim of a wheel, showing a pneumatic tire applied thereto according to my invention by a wire having three coils or convolutions. Fig. 2 is a diagram illustrating the wire before insertion. Fig. 3 is a diagrammatic view of the coil after insertion. Fig. 4 is a similar view to Fig. 1, but showing the tire or jacket cemented along one edge, the other edge only being secured by means of the three convolutions of wire. Fig. 5 is a similar view to Fig. 4, but showing the edge secured by a wire having only two convolutions. Fig. 6 is a diagrammatic view of the wire having two coils or convolutions. Fig. 7 is a similar view to Fig. 1, but showing the tire attached by means of one coil of three convolutions applied to each side of the cover. Fig. 8 is a diagram showing the coil after insertion. Figs. 9 and 10 are diagrams of the coil, illustrating how it is manipulated to attach to or remove the tire from the rim of a wheel.

Similar letters in all the figures represent similar or corresponding parts.

The dotted lines in the coil diagrams Figs. 3, 6, 8, 9, 10 indicate the portions of the coil within the tubular edge or edges of the cover, and the full lines the portions of the coils outside the cover.

According to the mode of carrying out my invention shown in Figs. 1, 2 and 3 one end of the wire may be attached to a suitable fixed point on the rim but is by preference attached, as shown in Fig. 3, to the other end of the wire so as to form an endless coil. The wire is carried partly round the rim and brought to one side of the same, where it is secured to or enters one edge of the cover and is carried quite round the same. From this point the wire is carried to the opposite side of the rim, say, during half a revolution and is then secured to or enters the other edge of the covering and carried completely round the same, and is thence carried around the rim to the starting point, where the free end may be attached to the rim but is by preference attached to the other end of the wire at $k$ so as to form a complete coil.

$a$ is the rim of the wheel, $b$ the inflatable tube or air-bag, and $c$ the jacket or cover formed with tubular edges $d$ in the usual manner.

In order to fix the tire to the rim $a$ the cover and air-bag having been placed around the rim I take a wire of a length slightly greater than three times the circumference of the channel of the rim and form the same into three coils as shown in Fig. 2. One end of this wire, as shown in Fig. 3, is passed partly around the rim, commencing, say, at $k$, and brought to one side of the same to about $l$, where it is passed into one of the tubular edges $d$ of the jacket or cover $c$ and is then carried around inside the same back to $l$. From this point $l$ the wire passes out of the tubular edge and is carried to the opposite side of the rim, say, for about half a revolution to $m$, and is then passed through the other tubular edge $d$ of the cover $c$ and carried around inside the same, the end of the wire passing out again at $m$ and on to the starting point $k$ when the two ends are hooked or otherwise connected together (or the ends of the wire may be attached to the rim) and the air-tube being inflated the tire will be brought into the position shown in Fig. 1. By this arrangement when the attaching wire is in its position for fixing the tire, as shown in the diagrammatic view, Fig. 3, the diameter or circumference of the convolutions of the wire is less than the larger diameter or circumference of the rim, and will therefore securely hold the tire in position when the tube is inflated; but the diameter of the convolutions is somewhat larger than the diameter of the rim at the bottom of the trough, so as to allow a little slack for one convolution to be enlarged at the expense of the others. This arrangement of fixing a tire allows of the cover and air-tube being loosened or removed with great facility, for, in cases where an air-tube with closed ends is employed, it is simply necessary to enlarge the convolution in one edge of the cover, thereby contracting the other convolutions of the coil so that the said edge of the cover can then be slipped over the rim. The other convolutions can now be enlarged at the expense of the convolutions free of the rim to allow of their being also passed over the edge of the rim. To again apply the tire the reverse operations are necessary, but in neither case is it necessary to disconnect the ends of the wire so that such ends may be permanently soldered together. In the case, however, where an endless air-tube is employed it is necessary to disconnect the ends of the wire to allow of taking out the said air-tube. It will thus be seen that where the ends of the wire are attached to one another, I am enabled by means of an endless coil with three convolutions to get the cover on and off and secure it in place.

First modification: It is obvious that if one edge of the cover is cemented or otherwise attached to the rim, I can apply my endless coil with three convolutions to the other edge of the rim, in which case the wire makes two complete convolutions inside one edge of the cover or jacket, and one without. Hence I am enabled still to attain the advantages of my invention and to secure the cover by means of a single wire. This modification is illustrated in Figs. 4, 8, 9 and 10. I take a wire as hereinbefore described such as is shown in Fig. 2 and pass one end thereof through a suitable hole into the tubular edge $d$ of one side of the cover $c$ commencing, say, at $e$, Fig. 8, and carry it around inside the said edge for about one revolution. The wire is then brought outside the edge $d$, at say, $f$ and passed about half around the outside of the cover $c$, as shown at $g$, until about the point $h$ when it is again passed through the edge $d$ for a complete revolution, and at $i$ it is again brought outside the said edge and passed around the outside of the same up to $j$, where the two ends of the wires are united together in any suitable manner, such as by twisting the ends together and then soldering them. To apply the tire with its coils in one edge of the cover, the other edge having been cemented or otherwise attached to the rim the air-tube is placed on the rim and the diameters of the two convolutions of the wire inside the edge are enlarged at the expense of the convolution which is outside the cover (as shown in Fig. 9) to such an extent that the two said convolutions can be passed over the edge of the rim $a$ of the wheel into the channel of the rim. The two convolutions having been passed over the edge of the rim, are then contracted to less than their normal diameter by enlarging the other convolution, as shown in Fig. 10, which convolution is then passed over the rim. On the air-tube being inflated the three convolutions of the wire will lie side by side, as clearly shown in Fig. 4 within the rim so that they cannot slip off, the tire being thereby securely attached to the rim. To get at or remove the air-chamber the convolution of the wire outside the cover is first enlarged, as shown in Fig. 10, and being slipped over the rim the other two convolutions of the wire are then enlarged, as shown in Fig. 9, when the air-chamber can be removed. It will be observed that in order to get sufficient slack to take the cover off and on by means of the arrangements of endless coil hereinbefore described, the coil should consist of at least three convolutions of wire; but if the ends of the wire are detachably connected two convolutions will be sufficient.

Second modification: Figs. 5 and 6 illustrate such a modification, in which the coil around the edge of the cover has only two convolutions, one within the tubular edge and the other composed of the ends of the wire without the tubular edge. In this case the ends of the wire can not be permanently connected to one another, but must be hooked together so that they can be unhooked in order to open the cover, or the ends of the wire may be otherwise detachably connected. Only sufficient slack wire to unhook the ends $k$ will now be necessary.

Although in the last two cases I have shown and described my wire as applied to one edge of the cover, the other edge being cemented or otherwise attached to the rim, it will be obvious that these arrangements may be duplicated, and that the cover may be attached by means of a coil of wire arranged as shown in Fig. 4 or 5. Such an arrangement with wires having three convolutions is illustrated in Fig. 7, which shows a duplication of the arrangement in Fig. 4, and needs no further description.

Although in practice I have found it advantageous to connect or secure the ends of the wire as hereinbefore described, yet I wish it to be understood that the ends of the wire may be left loose when about three convolutions of wire at least are used as the friction will then be sufficient to secure the wire. In this case the three convolutions of the coil may be passed through the tubular edge of the cover, the several convolutions lying one against the other within the tubular edge and the ends of the wire may project outside the cover. When the tire has been placed in position the projecting ends of the wire are pulled in opposite directions to reduce the diameter of the convolutions of the wire sufficiently to draw the edges of the cover into the groove or channel of the rim, the ends of the wire being tucked in between the said cover and the rim. When the air-chamber is inflated the cover will be firmly held without it being necessary to fasten the ends of the wire, the pressure of the wire against the cover producing sufficient friction to prevent the wires from slipping. In this case the wire I employ is as shown in Fig. 2 and when passed into the tubular edge of the rim the convolutions lie side by side as shown in that figure, the ends of the wire projecting outside the tubular edge of the cover.

Having now particularly described and ascertained the nature of my said invention and in what manner the same is to be performed, I declare that what I claim is—

1. The combination with a concave wheel rim, of a tire jacket having a tubular edge and a securing wire consisting of a plurality of convolutions, certain of said convolutions lying within said tubular edge and the other or others directly engaging the concave portion of said rim, substantially as described.

2. The combination with a concave wheel rim, of a tire jacket having a tubular edge and a securing wire consisting of an endless coil, having a plurality of convolutions, certain of said convolutions lying within said tubular edge and the other or others directly engaging the concavity of the rim, the diameter of said coil being less than the largest diameter of said rim and greater than its smallest diameter, substantially as described.

3. The combination with a concave wheel rim, of a tire jacket having a tubular edge and a securing wire consisting of a plurality of convolutions, certain of said convolutions lying within said tubular edge and the other or others directly engaging the concave portion of the rim, and means for removably securing the ends of the wire, substantially as described.

4. The combination with a concave wheel rim, of a tire jacket having a tubular edge and a securing wire consisting of a plurality of convolutions, the ends of said wire lying within said rim, and a pneumatic tube lying within said rim adapted upon inflation to engage the ends of said wire and hold the same firmly in position, substantially as described.

CHARLES HENRY GUEST.

Witnesses:
G. F. REDFERN,
JOHN E. BOUSFIELD,
*Of the firm of G. F. Redfern & Co., 4 South Street, Finsbury, London, Patent Agents.*